(12) United States Patent
Golov

(10) Patent No.: US 12,307,344 B2
(45) Date of Patent: May 20, 2025

(54) ADAPTED SCANNING WINDOW IN IMAGE FRAME OF SENSOR FOR OBJECT DETECTION

(71) Applicant: Micron Technology, Inc., Boise, ID (US)

(72) Inventor: Gil Golov, Backnang (DE)

(*) Notice: Subject to any disclaimer, the term of this patent is extended or adjusted under 35 U.S.C. 154(b) by 0 days.

(21) Appl. No.: 17/744,405

(22) Filed: May 13, 2022

(65) Prior Publication Data

US 2022/0270262 A1 Aug. 25, 2022

Related U.S. Application Data

(63) Continuation of application No. 16/448,624, filed on Jun. 21, 2019, now Pat. No. 11,348,245.

(51) Int. Cl.
| | | |
|---|---|---|
| *G06K 9/32* | (2006.01) | |
| *G06F 18/25* | (2023.01) | |
| *G06N 3/08* | (2023.01) | |
| *G06N 20/10* | (2019.01) | |
| *G06T 7/11* | (2017.01) | |

(Continued)

(52) U.S. Cl.
CPC ............ *G06N 20/10* (2019.01); *G06F 18/253* (2023.01); *G06N 3/08* (2013.01); *G06T 7/11* (2017.01); *G06V 10/25* (2022.01); *G06V 10/764* (2022.01); *G06V 10/82* (2022.01); *G06V 20/56* (2022.01); *G06V 20/58* (2022.01)

(58) Field of Classification Search
CPC ............ G06N 20/10; G06N 3/08; G06N 7/01; G06N 3/045; G06F 18/253; G06F 18/2413; G06T 7/11; G06T 7/73; G06T 2207/10004; G06T 2207/10016; G06T 2207/30252; G06V 10/25; G06V 10/764; G06V 10/82; G06V 20/56; G06V 20/58; G06K 9/00791; G06K 9/6203; G06K 9/629; G06K 9/78

See application file for complete search history.

(56) References Cited

U.S. PATENT DOCUMENTS 9,360,328 B2  6/2016  You et al.
9,607,226 B2  3/2017  Zhu et al.
(Continued)

FOREIGN PATENT DOCUMENTS

CN   106446832       2/2017
CN   107408303 A  * 11/2017  ......... G06K 9/00624
(Continued)

OTHER PUBLICATIONS

Direkoglu, C., et al., "Efficient Face and Facial Feature Tracking Using Search Region Estimation." ICIAR, Sep. 30, 2005.
(Continued)

*Primary Examiner* — Xin Jia
(74) *Attorney, Agent, or Firm* — Greenberg Traurig

(57) ABSTRACT

A scanning window is used to scan an image frame of a sensor when doing object detection. In one approach, positions within the image frame are stored in memory. Each position corresponds to an object detection at that position for a prior frame of data. A first area of the image frame is determined based on the stored positions. When starting to analyze a new frame of data, the first area is scanned to detect at least one object. After scanning within the first area, at least one other area of the new image frame is scanned.

20 Claims, 9 Drawing Sheets

(51) Int. Cl.
*G06V 10/25* (2022.01)
*G06V 10/764* (2022.01)
*G06V 10/82* (2022.01)
*G06V 20/56* (2022.01)
*G06V 20/58* (2022.01)

(56) References Cited

U.S. PATENT DOCUMENTS

| | | | |
|---|---|---|---|
| 9,672,446 B1 | 6/2017 | Vallespi-Gonzalez | |
| 10,013,773 B1* | 7/2018 | Ogale | G06N 3/04 |
| 11,348,245 B2 | 5/2022 | Golov | |
| 2011/0299783 A1 | 12/2011 | Chotard et al. | |
| 2014/0010409 A1* | 1/2014 | Yamashita | G06V 10/752 |
| | | | 382/103 |
| 2016/0110603 A1 | 4/2016 | Govil et al. | |
| 2016/0171311 A1* | 6/2016 | Case | G06V 20/53 |
| | | | 382/103 |
| 2016/0269714 A1 | 9/2016 | Rhemann et al. | |
| 2018/0082428 A1 | 3/2018 | Leung et al. | |
| 2018/0330526 A1 | 11/2018 | Corcoran | |
| 2019/0094877 A1 | 3/2019 | Smith et al. | |
| 2020/0265585 A1* | 8/2020 | Tasdizen | G06T 9/00 |
| 2020/0402240 A1 | 12/2020 | Golov | |

FOREIGN PATENT DOCUMENTS

| | | |
|---|---|---|
| CN | 108460356 | 8/2018 |
| CN | 109344725 | 2/2019 |
| JP | 2000348180 | 12/2000 |
| JP | 2008176555 | 7/2008 |

OTHER PUBLICATIONS

Yao, Zhu, et al., "Object Tracking based on Supervised Saliency Detection." Journal of Nanjing University (Natural Science), abstract only, Jul. 31, 2017.

* cited by examiner

ADAPTED SCANNING WINDOW IN IMAGE FRAME OF SENSOR FOR OBJECT DETECTION

RELATED APPLICATIONS

The present application is a continuation application of U.S. patent application Ser. No. 16/448,624 filed Jun. 21, 2019, the entire disclosure of which application is hereby incorporated herein by reference.

FIELD OF THE TECHNOLOGY

At least some embodiments disclosed herein relate to processing of sensor data for object detection in general and more particularly, but not limited to object detection using an adapted scanning window in an image frame of a sensor.

BACKGROUND

Autonomous vehicles typically include many sensors to assist in controlling the autonomous vehicle. In some cases, the failure of a sensor may cause an accident, collision, or near collision involving the vehicle.

Multiple sensor fusion is used in computing systems to manage imperfect inputs from an environment. Sensor fusion can use techniques such as artificial intelligence (AI), pattern recognition, digital signal processing, control theory, and statistical estimation. Data from multiple micro-electromechanical systems (MEMS) can be fused to provide applications with increased response and accuracy.

Advances in sensor technology and processing techniques, combined with improved hardware, make real-time fusion of sensor data possible. For example, a system can combine and integrate MEMS accelerometers, gyroscopes, pressure sensors, magnetic sensors, and microphones into multi-sensor combinations with on-board processing and wireless connectivity.

Depending on the application, fusion of data can take place in different ways, typically involving the level of complexity and the number of elements being measured. Feature-level fusion involves features that are extracted from different sensor observations or measurements and combined into a concatenated feature vector. Decision-level fusion takes information from each sensor after it has measured or evaluated a target individually.

One form of sensor data that can be used in sensor fusion is image data from a camera. A vehicle can navigate using information gathered about the environment based on the camera and other sensors of the vehicle. A computing device of the vehicle can receive the information from the sensors and process the information to control navigation of the vehicle (e.g., to avoid obstacles such as objects in the roadway). In addition to one or more cameras, an autonomous vehicle can include sensors such as lidar and/or radar.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
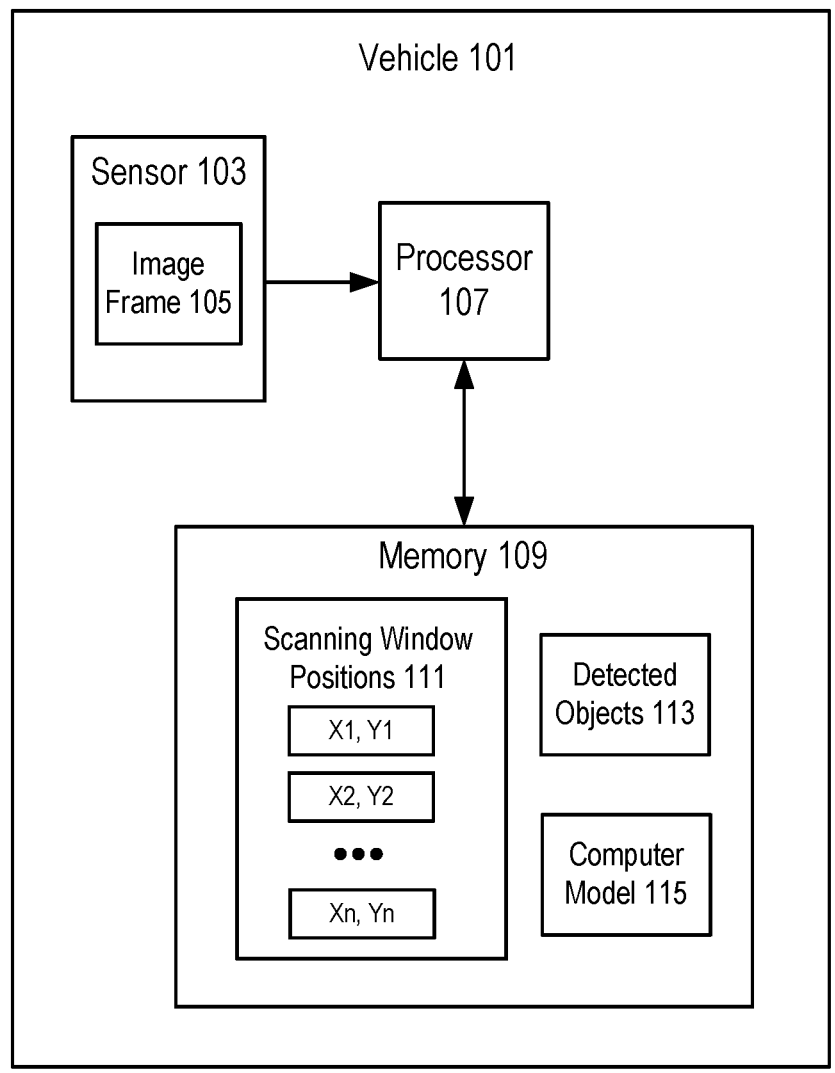
FIG. 1 shows an example computing system for processing data from a sensor based on stored scanning window positions, according to one embodiment.

At least some embodiments herein relate to processing of data collected by one or more sensors. In one embodiment, the sensor is a camera that collects data for an image. The data is collected within an image frame of the sensor. The collected data is scanned to detect one or more objects. The scanning of the collected data for a current image is adapted based on analysis of collected data for one or more prior images. In one embodiment, a scanning window is used to scan the image frame. The starting position of the scanning window in the image frame for the current image is determined based on analysis of the collected data for the prior images. In one example, a first area of the image frame is selected for scanning by incrementing the position of the scanning window across the image frame.

Various embodiments regarding an adapted scanning window as disclosed herein relate to systems and methods that can be used for an autonomous vehicle (e.g., navigation). The vehicle can be, for example, any of several types of autonomous vehicle (e.g., a car, truck, aircraft, drone, watercraft, etc.). However, use of these embodiments is not limited to an autonomous vehicle. Other implementations may include vehicles controlled by a human driver, fixed structures including devices that perform image processing and/or object detection (e.g., security systems), standalone sensor devices or systems (e.g., sold as components for assembly into final manufactured products), or yet other implementations (e.g., in which faster object detection is desired).

Proper autonomous vehicle system operation is mission critical in many cases. For example, proper vehicle navigation is critical to avoid collisions with persons or other vehicles. The time required to detect an object in the path of a vehicle may determine whether a collision can be avoided. Slow object detection times can increase the chance of an accident involving the vehicle.

Detection of objects by a vehicle is typically performed using one or more sensors. One of these sensors can be a camera that provides image data for an image frame of a sensor used in the camera. When more than one sensor is used, a sensor fusion system performs processing on data inputs from the various sensors.

In some cases, artificial intelligence (AI)-based sensor fusion is used. AI sensor fusion consists of a sensor (e.g., image, radar, lidar sensor) and a sensor fusion block (e.g., a circuit, or a processing device executing an image processing algorithm) that detects objects expected to be on the image. The sensor fusion algorithm(s) can be implemented on a dedicated processing device (e.g., SOC, FPGA, CPU, GPU, etc.).

One of the critical parameters in prior approaches for automotive and other mission critical applications is the object detection speed. Some prior approaches use a trained AI inference mechanism to detect objects in a predefined scanning window (e.g., 240×240 pixels). Note that it is highly resource-costly to increase the scanning window size. Typical image sensors (e.g., a sensor in a camera) provide a much larger image size than the AI scanning window. The object detection mechanism works by executing the AI object detection inside a scanning window, then shifting the scanning window to a new position. In one example, the scanning window is shifted a few pixels to the right to perform object detection, and then shifted several times again to detect objects in each of the several new locations. Object detection continues for each subsequent incremented location until the entire image (e.g., the image within the full image frame) is scanned.

One of the contributors for detection time of an object on the image sensor frame is the position of the object relative to the scanning window position. In prior approaches, the scanning window is moved in a simplistic, systematic way (e.g., 8 pixels to the right after each scan) for all incremented positions. However, this often causes the technical problem of slow object detection. For example, in some cases the position of the scanning window using this simplistic approach is slowly incremented in a location of the image frame that is far removed from objects to be detected. Thus, detection of the object is significantly delayed.

Various embodiments of the present disclosure provide a technological solution to one or more of the above technical problems. For example, various embodiments below provide a different way to scan data collected for an image (or alternatively a region of three-dimensional space around a vehicle) by one or more sensors in order to accelerate the detection of expected objects as compared to the prior approaches above. For example, a two-dimensional area, or more generally a three-dimensional region, is selected in which to begin the scanning (e.g., using an incremented scanning window for a current image collected by a camera). The selection of the starting region is based on stored positions from prior scanning (e.g., prior object detection done for prior images from a camera).

In one embodiment, a method includes: storing positions corresponding to collection of data by a sensor, each position associated with an object detection, and the sensor configured to collect data from a plurality of regions; selecting a first region (e.g., Region A of FIG. 3) of the plurality of regions, wherein the first region is selected based on the stored positions; and scanning data collected within the first region, the scanning to detect at least one object within the first region.

In one embodiment, a method includes: storing positions within an image frame of a sensor (e.g., a camera), each position corresponding to an object detection based on data collected by the sensor; selecting a first area of a plurality of areas of the image frame, wherein the first area is selected using the stored positions and based on a level of object detection activity associated with each of the areas; and scanning data collected within the first area for a current image, the scanning to detect at least one object within the first area.

In one example, the stored positions are stored in a memory. For example, the memory can be configured to store 1,000 positions as (X, Y) coordinate pairs. In one example, the coordinate reference (X=0, Y=0) is a corner of an image frame. In one example, the reference is a position on the vehicle (e.g., the frame, or an exterior component). The positions correspond to locations of the scanning window at the time for which an object is detected by an image processing algorithm.

In one embodiment, the stored positions are classified by each of the regions. For example, a number of object detections for a first region is stored, and a number of object detections for a second region is also stored. The level of object detection activity for each region can be compared. The region having the highest level of object detection activity can be used to select or define a starting region for future scanning (e.g., using a computer model or other approach that implements computer vision processing, such as described below).

In one embodiment, a method includes: storing, in memory, positions within an image frame, each position corresponding to an object detection; determining a first area (e.g., Region A of FIG. 3) of the image frame, wherein the determination is based on the stored positions; scanning within the first area to detect at least one object; and after scanning within the first area, scanning within at least one other area (e.g., Regions B, C, D, and/or E of FIG. 3) of the image frame.

In one embodiment, the sensor is a camera. A scanning window is incremented in an image frame for the data collected by the sensor. In other embodiments, other types of sensors can be used (e.g., a lidar or radar sensor). In one example, the selection of a scanning region based on stored positions can be applied to any kind of sensor that provides a higher resolution than a scanning window or other scanning technique that may be used.

Figure 3:
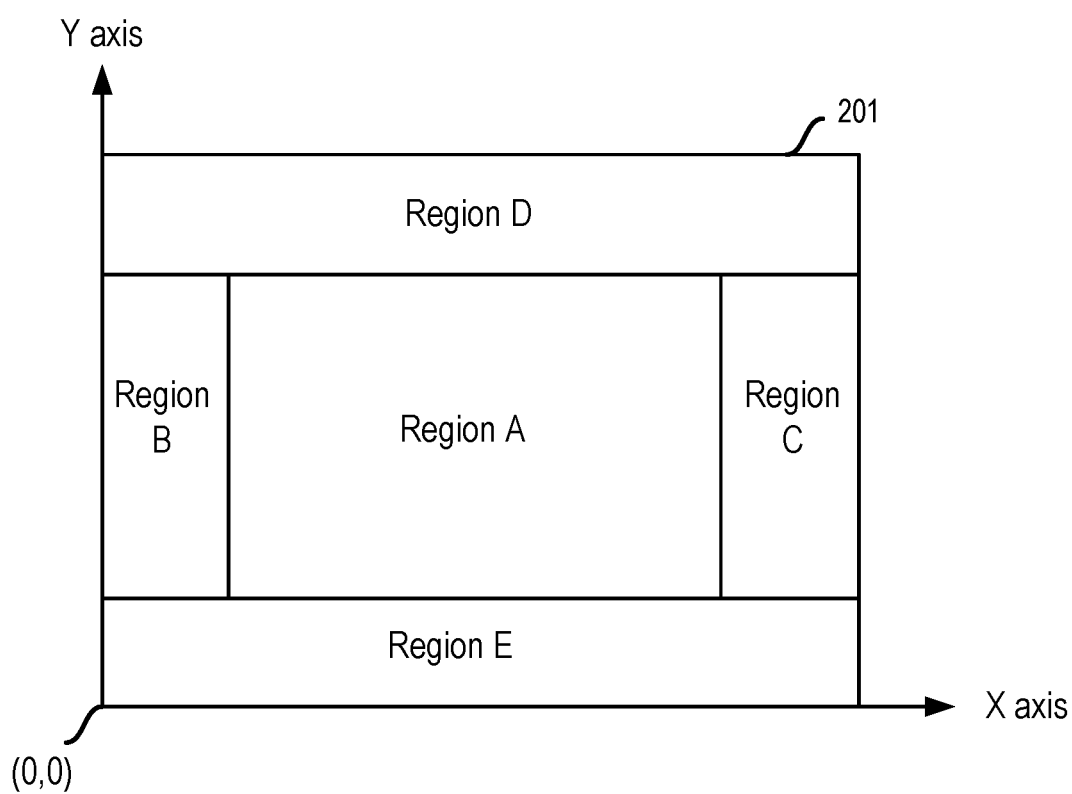
FIG. 3 shows an example of various defined regions of an image frame, according to one embodiment.

In one embodiment, an algorithm is used that positions and scans the image windows by first scanning the areas when there is a high activity of objects based on previous detections (e.g., area A as illustrated in FIG. 3, and indicated more generally as a "Region"). Areas with low object activities (e.g., areas B, C, D, E of FIG. 3) (e.g., areas corresponding to a sky area such as Region D of FIG. 3) are scanned last. This algorithm improves the detection time in many cases as there is a higher chance to hit an object within the scanning window at an earlier time of the image scanning process as compared to prior approaches.

In one embodiment, as part of selecting a region or area to scan first, the boundary of the region or area is determined (e.g., an algorithm is used to define coordinates of the boundary in two-dimensional or three-dimensional space). In one embodiment, the borders of an area (e.g., Region or area A) to be scanned first are determined as described below.

As long as there is no existing detection history (e.g., for deployment of a new vehicle or system), the entire image within the image frame is defined as area A.

Figure 4:
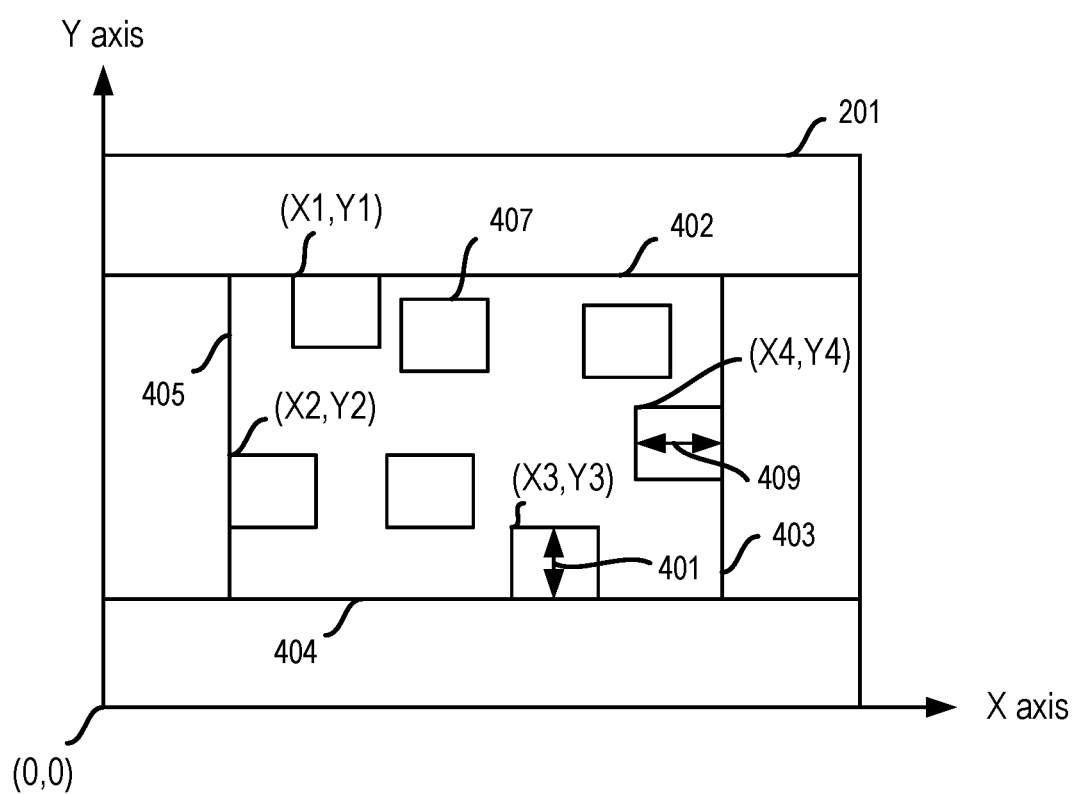
FIG. 4 shows an example of various positions for a scanning window in an image frame that are associated with object detection, according to one embodiment.

Each time there is an object detection, the position of the scanning window (e.g., (X1, Y1) in FIG. 4) is stored in memory. The memory stores n last positions of scanning windows (e.g., n=1,000 or other predetermined memory size). In one example, when the memory is full, each new position entry replaces the oldest entry in memory.

After completion of each image sensor frame, and when there is sufficient history in memory (e.g., the predetermined maximum of 1,000 stored positions, or a number below the maximum in alternative embodiments), the borders of area A are calculated as follows:

Upper border=maximum (all Y positions in memory)
Lower border=minimum (all Y positions in memory)–scanning window vertical size
Left border=minimum (all X positions in memory)
Right border=maximum (all X positions in memory)+scanning window horizontal size On the next image to be processed for object detection, first area A will be scanned for objects. Then, the other remaining areas are scanned. In one example, the scanning sequence can be undefined or random for other areas (e.g., Regions B, C, D, E as illustrated in FIG. 3). In one example, other regions or areas can be scanned in an order determined by a level of object activity for each respective region or area. In one example, a predetermined order of area priority can be used.

In one embodiment, the scanning within a given area (e.g., area A, B, C, D, or E) is performed using a scanning window with known existing image processing algorithms to detect objects within the scanning window at its current position in the given area.

FIG. 1 shows an example computing system of a vehicle 101 for processing data from a sensor 103 based on stored scanning window positions 111, according to one embodiment. The window positions 111 are stored in a memory 109. The stored positions 111 correspond to positions of the scanning window when scanning data collected by sensor 103 for prior images. The stored positions 111 correspond to a position of the scanning window within an image frame 105. Data collected from sensor 103 is used, for example, to navigate vehicle 101.

Data collected by sensor 103 within image frame 105 is provided to the processor 107. When a new image within image frame 105 is collected by sensor 103, processor 107 executes an algorithm to determine a first area of image frame 105 in which to start scanning for object detection in the new image. The determination of the first area is based on the stored scanning window positions 111.

After the first area is determined, processor 107 scans the first area to detect one or more objects. As each object is detected, data corresponding to the detected object to stored in a database of detected object 113 in memory 109. The image processing algorithm used to scan the new image can be stored as computer model 115 in memory 109. In one example, computer model 115 includes a neural network and/or other machine learning algorithm.

Figure 2:
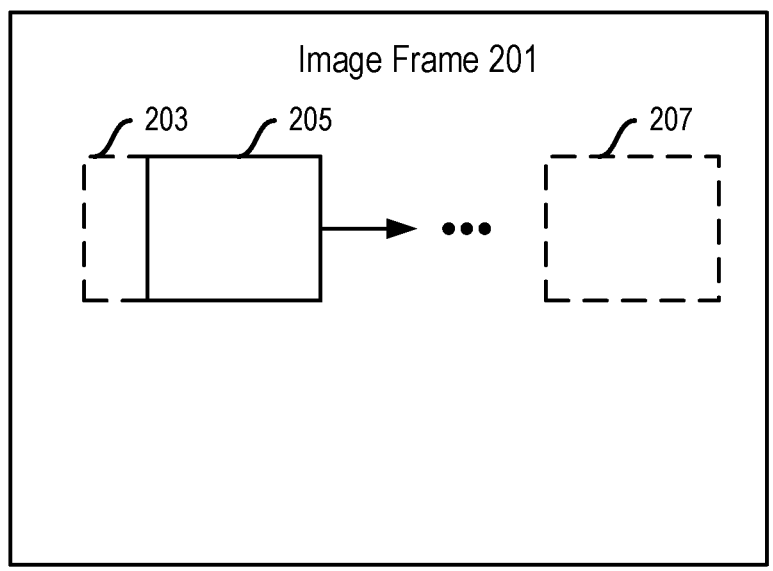
FIG. 2 shows an example image frame of a sensor, according to one embodiment.

FIG. 2 shows an example image frame 201 of a sensor (e.g., sensor 103 of FIG. 1), according to one embodiment. Image frame 201 is an example of image frame 105 of FIG. 1. As illustrated in FIG. 2, a scanning window is incremented across image frame 201 to scan data collected by the sensor. The scanning window is indicated (by solid lines) as being at a current position 205, for which data is collected and analyzed to detect objects for a current image captured (e.g., by a camera) for the image frame 201.

A prior position 203 of the scanning window is indicated (by dashed lines). A portion of the scanning window positions 111 stored in memory 109 can correspond to object detections that occurred at prior position 203. A next position 207 of the scanning window is indicated (by dashed lines). An object detection algorithm is executed for current position 205 and then will be executed again at next position 207.

FIG. 3 shows an example of various defined regions (e.g., Regions A, B, C, D, and/or E) of image frame 201, according to one embodiment. Image frame 201 is an example of image frame 105. A sensor collects data within the image frame 201. In one example, the sensor is sensor 103. In one example, the sensor is a camera of an autonomous vehicle that collects data in the form of numerous pixels at positions within the image frame 201.

The positions of data collection within image frame 201 are indicated by a horizontal X axis and a vertical Y axis. The origin of the X axis and the Y axis has a position of (0,0) in this example. In one example, each pixel of data collected by a camera has a position indicated by a pair of coordinates corresponding to a horizontal position in a vertical position of the pixel.

In one embodiment, a sensor has collected data for a current image within image frame 201 for analysis. Analysis of the collected data begins within a first predetermined region (e.g., Region A). The position of the first predetermined region is defined by horizontal and vertical coordinates within the image frame 201.

In one example, a camera collects data for a sequence of images over time. The first predetermined region above that is used as a starting position for the object detection analysis of a current image in this sequence is selected based on analysis of stored positions obtained based on prior images collected by the camera. In one embodiment, the first predetermined region is selected based on a level of object detection activity associated with each of various regions within image frame 201.

In one embodiment, scanning of the current image within image frame 201 is performed by incrementing a scanning window within the first predetermined region above (e.g., Region A). In one example, as one or more objects may be detected using the scanning window, the positions of the scanning window when such detection occurs are stored in memory. In one example, the positions are scanning window positions 111 that are stored in memory 109 of FIG. 1. The positions of the scanning window stored in memory for the current image being scanned will be used to select a first region of the image frame 201 in which to initiate scanning for future images collected by the sensor. In some examples, the first region selected can be a region that is near the periphery of image frame 201 (e.g., Region C or E).

In one embodiment, each of the regions corresponds to an area in two-dimensional space (e.g., an active area of an image sensor of a camera). In one embodiment, each of the regions corresponds to a volume in three-dimensional space. In one example, this three-dimensional volume corresponds to a region for which a sensor can collect data.

In one example, a lidar sensor collects data in three-dimensional space surrounding all or a portion of an autonomous vehicle. The three-dimensional space can be divided into various three-dimensional regions. A first of these regions can be selected (e.g., based on stored positions 111) for data collection for a given frame of data and/or for a given time period.

FIG. 4 shows an example of various positions for scanning window 407 in image frame 201 that are associated with object detection, according to one embodiment. Each position of the scanning window 407 is indicated by a pair of X and Y coordinates (X, Y) in image frame 201. The scanning window 407 is incremented within image frame 201. When one or more objects is detected, the position of the scanning window 407 is stored in memory. For example, these stored positions include (X1, Y1), (X2, Y2), (X3, Y3), and (X4, Y4).

In one embodiment, after scanning of image from 201 is complete, a first area of image frame 201 is determined based on the above stored positions. Borders for the first area (e.g., Region A) are determined by defining vertical positions and horizontal positions within the image frame 201. These borders are determined based on the above stored positions.

The borders of the first area include an upper border 402, a lower border 404, a left-side border 405, and a right-side border 403. The vertical position of the upper border 402 is determined by taking a maximum of all vertical Y axis positions stored in memory (e.g., Y1). The vertical position of the lower border 404 is determined by taking a minimum of all vertical Y axis positions in memory (e.g., Y3), and then subtracting a size 401 of the scanning window.

The horizontal position of the left-side border 405 is determined by taking a minimum of all horizontal X axis positions stored in memory (e.g., X2). The horizontal position of the right-side border 403 is determined by taking a maximum of all horizontal X axis positions stored in memory (e.g., X4), and then adding a size 409 of the scanning window.

In one embodiment, the first area in which to begin scanning is determined as described above for each frame of image data to be collected by a sensor. In one embodiment, the number of positions of the scanning window stored in memory is limited to a predetermined maximum. The determination of the first area for scanning can be based on all stored positions or can be based on a subset of the stored positions that is less than the predetermined maximum storage. In one example, the memory is a cyclic memory in which, when the number of positions stored in memory reaches the predetermined maximum, the oldest one of the stored positions is replaced with a new position of the scanning window.

In one embodiment, object detection includes training a computer model using at least one of supervised or unsupervised learning, and analyzing video data using the computer model. In one example, the computer model includes a neural network. In one example, the computer model is computer model 115. In one example, the video data is collected by sensor 103.

In one embodiment, object detection using a scanning window within image frame 105 may include using machine learning technology (e.g., a computer model such as a trained neural network) to detect an object that is identified in video data collected by a camera.

In one embodiment, the object detection may further include inputting video features extracted from video data into a computer model. For example, the video data used for training the computer model may be collected prior to analyzing the video data above. In one example, the computer model may be one or more artificial neural networks. For example, the neural networks may be trained based on video data collected by a sensor device.

In one embodiment, the object detection may further include determining an output from the computer model based on the extracted video data features. For example, the output from the computer model may be based on an output that is adjusted using a context determined from the collected video data.

In one embodiment, processor 107 may include functionality for the local processing of information, without the need of a server or backend computing device. In some embodiments, the processor 107 includes an audio analysis module, a video analysis module, and configuration settings, among other special purpose software units. Each of these modules may be stored as instructions and/or data on a memory device, such as the memory 109 (e.g., EEPROMs, and/or other non-volatile memory). The specific configuration and software used to instantiate these modules may be modifiable and updateable (e.g., may be updated from a remote computing device over a network).

The configuration setting(s) may also represent a particular configuration, parameters, weightings, or other settings of a quantitative model, classifier, machine learning algorithm, or the like. As one example, a support vector machine (SVM) may be represented as a hyperplane that divides two regions of vector space into two respective classifications. The coefficients defining the hyperplane may be included within the configuration setting(s). As another example, an artificial neural network (ANN) may comprise a set of interconnected nodes, with specific weights between each node connection. These connection weights may also be included within the configuration setting(s).

The processor 107 may carry out methods for detecting a particular audio event or a particular object within a video frame (e.g., a video frame within image frame 105 of FIG. 1). In some implementations, the processor 107 and/or other computing device includes a classifier or machine learning algorithm that is executed locally on vehicle 101. The parameters or weightings of the classifier or machine learning algorithm—that is, the configuration setting(s)—may be updated (e.g., received from a computing device via a communication module). Thus, the configuration setting(s) may include parameters, coefficients, or weightings that enable or improve the audio analysis module and the video analysis module to carry out particular tasks.

In some cases, various embodiments of a computing system including the processor 107 and/or the memory 109 may include thereon instructions that, upon execution, implement computer vision and/or image or video analysis functions. Alternatively, or additionally, a computing device (e.g., a device that includes processor 107) can include one or more integrated circuits in communication with processor(s) to carry out aspects of computer vision functions, such as object recognition, image or video compression, and/or face detection, among other functions.

As described herein, computer vision includes, for example, methods for acquiring, processing, analyzing, and understanding images and, in general, high-dimensional data from the real world in order to produce numerical or symbolic information, e.g., in the form of decisions. The image data can take many forms, such as video sequences, views from multiple cameras, or multi-dimensional data from a scanner.

One aspect of computer vision comprises determining whether or not the image data contains some specific object, feature, or activity. Different varieties of computer vision recognition include: Object Recognition (also called object classification)—One or several pre-specified or learned objects or object classes can be recognized, usually together with their 2D positions in the image or 3D poses in the scene. Identification—An individual instance of an object is recognized. Examples include identification of a specific object, identification of landscape or structures, and/or identification of a specific vehicle type. Detection—The image data are scanned for a specific condition. Examples include detection of a vehicle in an automatic road toll system. Detection based on relatively simple and fast computations is sometimes used for finding smaller regions of interesting image data that can be further analyzed by more computationally demanding techniques to produce a correct interpretation.

Typical functions and components (e.g., hardware) found in many computer vision systems are described in the following paragraphs. The present embodiments may include at least some of these aspects. For example, with reference to FIG. 1, embodiments of the vehicle 101 may include a computer vision module. The computer vision module may include any of the components (e.g., hardware) and/or functionality described herein with respect to computer vision, including, without limitation, one or more cameras, sensors, and/or processors. In some of the present embodiments, a microphone, a camera, and/or an imaging processor may be components of the computer vision module.

Image acquisition—A digital image is produced by one or several image sensors, which, besides various types of light-sensitive cameras, may include range sensors, tomography devices, radar, ultra-sonic cameras, etc. Depending on the type of sensor, the resulting image data may be a 2D image, a 3D volume, or an image sequence. The pixel values may correspond to light intensity in one or several spectral bands (gray images or color images), but can also be related to various physical measures, such as depth, absorption or reflectance of sonic or electromagnetic waves, or nuclear magnetic resonance.

Pre-processing—Before a computer vision method can be applied to image data in order to extract some specific piece of information, it is usually beneficial to process the data in order to assure that it satisfies certain assumptions implied by the method. Examples of pre-processing include, but are not limited to re-sampling in order to assure that the image coordinate system is correct, noise reduction in order to assure that sensor noise does not introduce false information, contrast enhancement to assure that relevant information can be detected, and scale space representation to enhance image structures at locally appropriate scales.

Feature extraction—Image features at various levels of complexity are extracted from the image data. Typical examples of such features are: Lines, edges, and ridges; Localized interest points such as corners, blobs, or points; More complex features may be related to texture, shape, or motion.

Detection/segmentation—At some point in the processing a decision may be made about which image points or regions of the image are relevant for further processing. Examples are: Selection of a specific set of interest points; Segmentation of one or multiple image regions that contain a specific object of interest; Segmentation of the image into nested scene architecture comprising foreground, object groups, single objects, or salient object parts (also referred to as spatial-taxon scene hierarchy).

High-level processing—At this step, the input may be a small set of data, for example a set of points or an image region that is assumed to contain a specific object. The remaining processing may comprise, for example: Verification that the data satisfy model-based and application-specific assumptions; estimation of application-specific parameters, such as object pose or object size; image recognition—classifying a detected object into different categories; image registration—comparing and combining two different views of the same object.

Decision making—Making the final decision required for the application, for example match/no-match in recognition applications.

In one example, the decision is that an object has been detected. In such case, the position of a scanning window in an image frame (e.g., image frame 105) is stored in memory.

One or more of the present embodiments may include a vision processing unit (which may be a component of a computer vision module). In one example, a vision processing unit is a class of microprocessor; it is a specific type of AI (artificial intelligence) accelerator designed to accelerate machine vision tasks. Vision processing units are distinct from video processing units (which are specialized for video encoding and decoding) in their suitability for running machine vision algorithms such as convolutional neural networks, SIFT, etc. Vision processing units may include direct interfaces to take data from cameras (bypassing any off-chip buffers), and may have a greater emphasis on on-chip dataflow between many parallel execution units with scratchpad memory, like a many-core DSP (digital signal processor). But, like video processing units, vision processing units may have a focus on low precision fixed point arithmetic for image processing.

In one embodiment, recognition algorithms can be divided into two main approaches: geometric, which looks at distinguishing features; or photometric, which is a statistical approach that distills an image into values and compares the values with templates to eliminate variances.

Some recognition algorithms include principal component analysis using eigenfaces, linear discriminant analysis, elastic bunch graph matching using the Fisherface algorithm, the hidden Markov model, the multilinear subspace learning using tensor representation, and the neuronal motivated dynamic link matching.

Additionally, or alternatively, a computing device (e.g., a device of vehicle 101) may also transmit captured audio/video to a computing device, such as a backend server, over a network for subsequent processing thereof. Such a backend server may, in some cases, conduct audio, image, and/or video analyses to determine the presence or absence of some object or event. If a detection is made, the backend server may then transmit messages to the computing device, a client device, and/or other devices. In some instances, transmitted audio/video may be stored in a storage device (e.g., in a database), to serve as training data for the purpose of generating and/or improving a classifier or machine learning tool.

A computing device (e.g., vehicle 101 of FIG. 1) may comprise components that facilitate the operation of a camera. For example, an imager may comprise a video recording sensor and/or a camera chip. In one aspect of the present disclosure, the imager may comprise a complementary metal-oxide semiconductor (CMOS) array, and may be capable of recording high definition (e.g., 720p, 2120p, etc.) video files.

A camera processor may comprise an encoding and compression chip. In some embodiments, the camera processor may comprise a bridge processor. The camera processor may process video recorded by the imager, and may transform this data into a form suitable for wireless transfer by a communication module to a network. The camera memory may comprise volatile memory that may be used when data is being buffered or encoded by the camera processor. For example, in certain embodiments the camera memory may comprise synchronous dynamic random access memory (SD RAM). Infrared LED(s) may comprise light-emitting diodes capable of radiating infrared light. Infrared filter(s) may comprise a system that, when triggered, configures the imager to see primarily infrared light as opposed to visible light. When the light sensor(s) detects a low level of ambient light (which may comprise a level that impedes the performance of the imager in the visible spectrum), the infrared LED(s) may shine infrared light out to the environment, and the infrared filter(s) may enable the imager to see this infrared light as it is reflected or refracted off of objects within a field of view of the sensor. This process may provide a computing device with a night vision function.

Various embodiments regarding determining an area of an image frame for scanning of image data may be implemented using a computing device (e.g., vehicle 101) that includes a processor(s) (e.g., processor 107), memory (e.g., memory 109), a display(s), a communication module(s), an input device(s), a speaker(s), a microphone(s), a connector(s), a battery, and a data port. These components are communicatively coupled together by an interconnect bus. The processor(s) may include any processor used in smartphones and/or portable computing devices, such as an ARM processor (a processor based on the RISC (reduced instruction set computer) architecture developed by Advanced RISC Machines (ARM.).). In some embodiments, the processor(s) may include one or more other processors, such as one or more conventional microprocessors, and/or one or more supplementary co-processors, such as math co-processors.

The memory may include both operating memory, such as random access memory (RAM), as well as data storage, such as read-only memory (ROM), hard drives, flash memory, or any other suitable memory/storage element. The memory may include removable memory elements, such as a CompactFlash card, a MultiMediaCard (MMC), and/or a Secure Digital (SD) card. In some embodiments, the memory may comprise a combination of magnetic, optical, and/or semiconductor memory, and may include, for example, RAM, ROM, flash drive, and/or a hard disk or drive. The processor(s) and the memory each may be, for example, located entirely within a single device, or may be connected to each other by a communication medium, such as a USB port, a serial port cable, a coaxial cable, an Ethernet-type cable, a telephone line, a radio frequency transceiver, or other similar wireless or wired medium or combination of the foregoing. For example, the processor(s) may be connected to the memory via the data port.

The display(s) may include any user interface or presentation elements suitable for a smartphone and/or a portable computing device, such as a keypad, a display screen, a touchscreen, a microphone, and a speaker. The communication module(s) is configured to handle communication links between the computing device and other, external devices (e.g., server) or receivers, and to route incoming/outgoing data appropriately. For example, inbound data from the data port may be routed through the communication module(s) before being directed to the processor(s), and outbound data from the processor(s) may be routed through the communication module(s) before being directed to the data port. The communication module(s) may include one or more transceiver modules capable of transmitting and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, or any other protocol and/or technology.

The data port may be any type of connector used for physically interfacing with a smartphone and/or a portable computing device, such as a mini-USB or USB-C port or an IPHONE®/IPOD® 30-pin connector or LIGHTNING® connector. In other embodiments, the data port may include multiple communication channels for simultaneous communication with, for example, other processors, servers, and/or client terminals.

The memory may store instructions for communicating with other systems, such as a computer. The memory may store, for example, a program (e.g., computer program code) adapted to direct the processor(s) in accordance with the present embodiments. The instructions also may include program elements, such as an operating system. While execution of sequences of instructions in the program causes the processor(s) to perform the process steps described herein, hard-wired circuitry may be used in place of, or in combination with, software/firmware instructions for implementation of the processes of the present embodiments. Thus, the present embodiments are not limited to any specific combination of hardware and software.

The input device(s) may include any combination of hardware and/or software elements that receive user input and/or facilitate the interpretation of received input. The input device(s) may be hardware (e.g., physical buttons and switches), software (e.g., virtual buttons, sliders, etc.), or some combination thereof (e.g., software-controlled haptic feedback for simulating button clicks). In some instances, the input device(s) includes a touchscreen or touch-based digitizer. The input device(s) may include a virtual keyboard or other virtual input elements as well.

The speaker(s) may include any combination of speakers or other sound-emitting devices. The speaker(s) may be operable to produce a variety of sounds, such as audio from live video, notification or alert sounds, or other audible sounds.

The microphone(s) may include any combination of transducers that convert pressure waves into electrical signals. The microphone(s) may capture audio, which may, in some instances, be transmitted to a separate computing device or server. That transmitted audio may then be relayed to another computing device.

The antenna may enable the computing device to communicate wirelessly. For instance, the antenna permits the computing device to communicate over cellular networks, via one or more communication standards (e.g., GSM, CDMA, LTE, etc.). The antenna may allow the computing device to communicate over other wireless protocols, such as Wi-Fi or Bluetooth, among other wireless protocols. The antenna may include multiple antennae, depending on the particular implementation.

Figure 5:
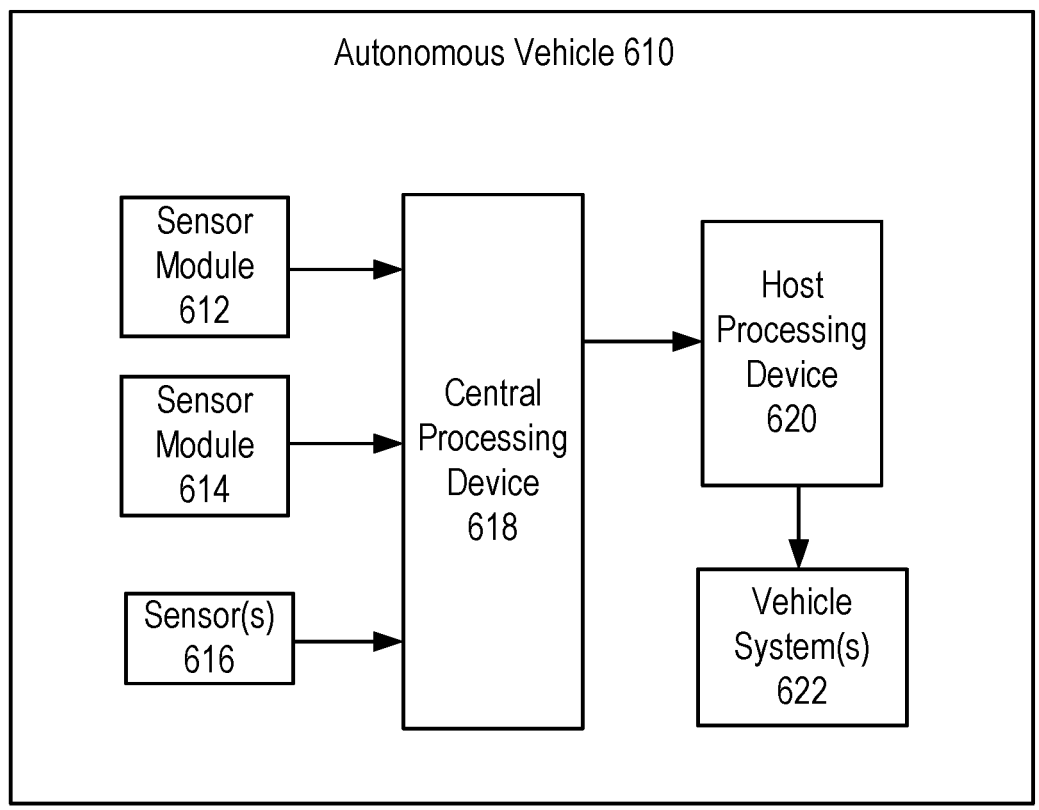
FIG. 5 illustrates an autonomous vehicle including sensor modules that provide data to a central processing device, according to one embodiment.

FIG. 5 illustrates an autonomous vehicle 610 including sensor modules 612 that provide data to a central processing device 618, according to one embodiment. Central processing device 618 is an example of processor 107 of FIG. 1.

Each sensor module 612, 614 provides object data to central processing device 618. One or more other sensors 616 provide sensor data to central processing device 618. In one embodiment, sensors 616 provide raw sensor data and/or object data.

Central processing device 618 compares the object data received from each of the sensor modules 612, 614. In one example, the comparison is based on detection of a single object in the field of view of sensor module 612 and sensor module 614. In one example, the comparison is based on a correlation determined based on several events, each event related to detection of a different object. Central processing device 618 uses the comparison of the object data to determine whether the object data from sensor module 612 corresponds to an object.

In response to detecting an object, central processing device 618 sends a signal to a host processing device 620. The signal indicates that an object has been identified.

In one embodiment, host processing device 620 performs one or more actions in response to receiving the signal indicating object detection. In various embodiments, host processing device 620 sends control signals to one or more vehicle systems 622 that change the operation of one or more aspects of the autonomous vehicle 610. In one example, navigation, braking control, and/or engine control are changed. In another example, a configuration for one or more vehicle systems 622 is updated. In one example, firmware for one of the vehicle systems 622 is updated. In one example, at least a portion of the firmware is downloaded from a central server using wireless communications.

In one embodiment, sensors 616 provide data to central processing device 618 that is used to determine a context of operation of autonomous vehicle 610. For example, sensor 616 may provide data indicating whether the vehicle is currently operating in daytime or nighttime. This provides contextual data that central processing device 618 can use in analyzing image data to detect an object.

In one example, central processing device 618 is a system-on-chip (SOC), field programmable gate array (FPGA), CPU, or graphics processing unit (GPU). In one example, central processing device 618 stores run-time data in a volatile memory device(s) (e.g., a DRAM device). In one example, central processing device 618 can include logic circuitry implementing at least a portion of various embodiments described herein.

In one example, host processing device 620 is a system-on-chip (SOC), field programmable gate array (FPGA), CPU, or graphics processing unit (GPU). In one example, host processing device 620 stores data in a volatile memory device(s). For example, the data stored is received from vehicle systems 622. The host processing device 620 can be, for example, a processing core of a processor, an execution unit, etc.

In one example, the central processing device 618 and/or host processing device 620 can include hardware such as one or more integrated circuits and/or discrete components, a buffer memory, a cache memory, or a combination thereof. The host or central processing device can be a microcontroller, special purpose logic circuitry (e.g., a field programmable gate array (FPGA), an application specific integrated circuit (ASIC), etc.), or another suitable processor.

In one example, each sensor module 612, 614 is a camera. Each camera shares a common field of view. It is expected during normal operation that the cameras will detect the same object most of the time.

Figure 6:
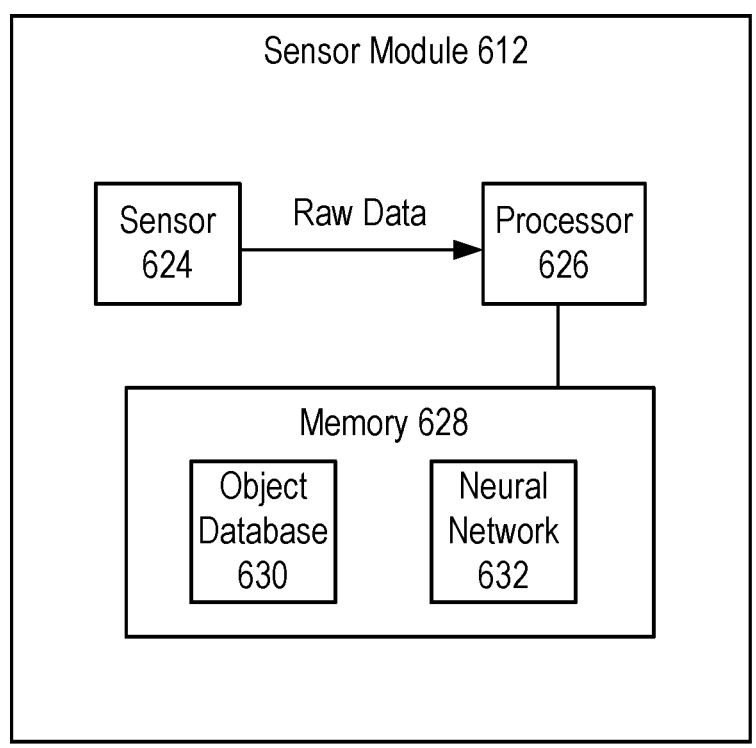
FIG. 6 illustrates a sensor module including a sensor that provides raw data to a processor, according to one embodiment.

FIG. 6 illustrates a sensor module 612 including a sensor 624 that provides raw data to a processor 626, according to one embodiment. Processor 626 is an example of processor 107 of FIG. 1.

In one example, sensor module 614 is the same as or similar to sensor module 612. In another example, sensor 616 is similar to sensor module 612. In one example, sensor 624 is a camera. In another example, sensor 624 is a radar or lidar sensor. Processor 626 is, for example, a microprocessor, a GPU, and/or an FPGA.

Processor 626 executes one or more processes to evaluate the raw data from sensor 624. Processor 626 provides object data as a result from this processing. The object data is transmitted to a central processing device. The object data includes, for example, position data and/or object type data. Other metadata characterizing the detected object may also be included.

Processor 626 accesses memory 628 during operation. Memory 628 is, for example, volatile memory and/or non-volatile memory.

Memory 628 includes an object database 630. Database 630 includes a library of object types. Processor 626 can retrieve a predetermined object type from the library when providing a result from evaluating raw data from sensor 624.

In one embodiment, neural network 632 is stored in memory 628. Neural network 632 can be used to provide one or more inputs to processor 626 when it is evaluating raw data from sensor 624. In one embodiment, neural network 632 receives inputs from sensors 616 that are used for determining a context of operation for autonomous vehicle 610 as an output from the neural network 632. The output is provided to processor 626 for use in evaluating raw data from sensor 624.

Figure 7:
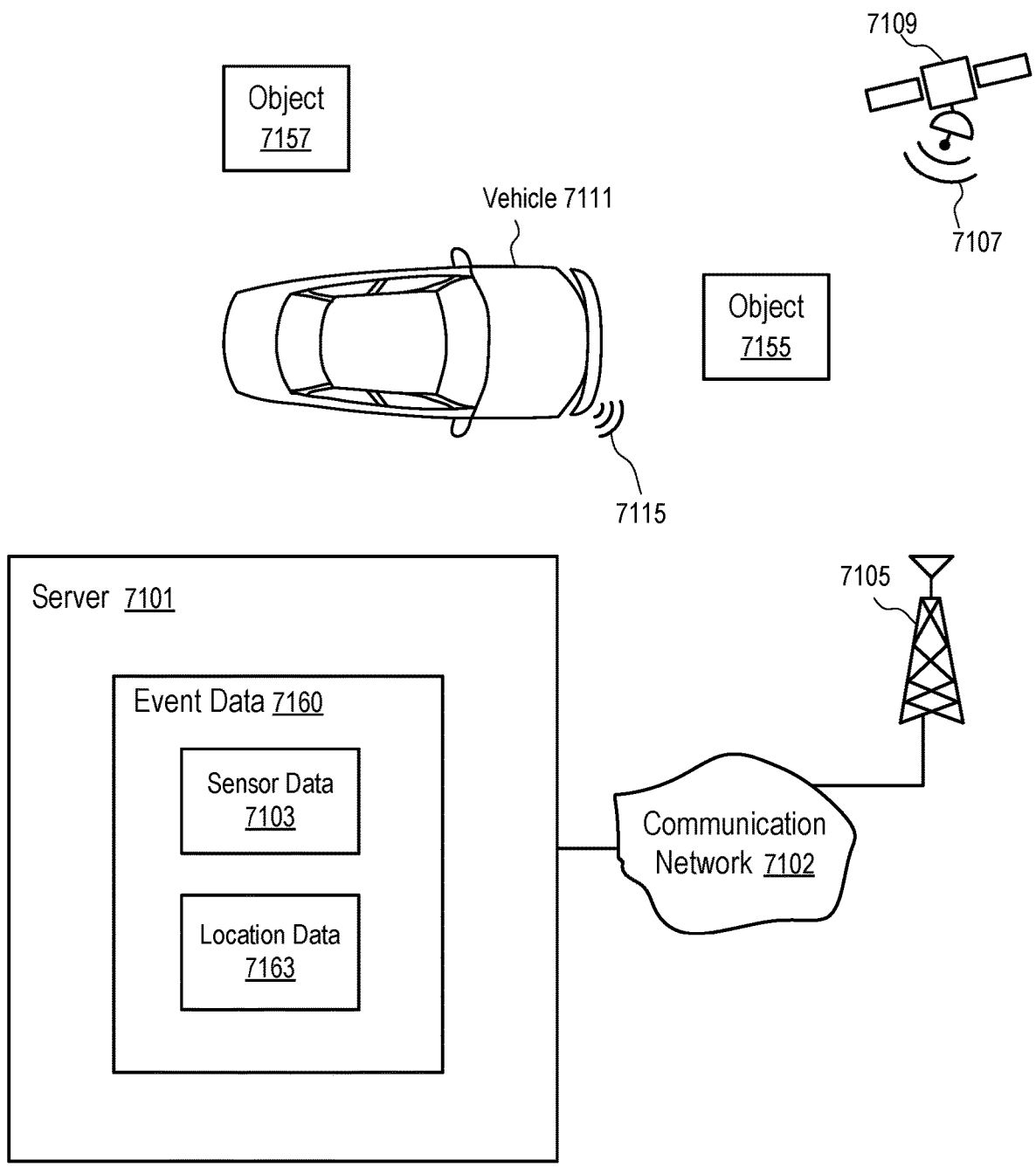
FIG. 7 illustrates a server that stores event data received from a vehicle, according to one embodiment.

FIG. 7 illustrates a server 7101 that stores event data received from a vehicle 7111, according to one embodiment. Vehicle 7111 is an example of vehicle 101 of FIG. 1.

In one example, the event data corresponds to a determination by a central processing device (e.g., a CPU and/or sensor module of vehicle 7111 that scans image frames of sensors using a scanning window to detect objects) that an object has been detected by one or more sensor modules of vehicle 7111. For example, vehicle 7111 may detect object 7155 using sensor modules that send object data to the central processing device.

In one example, event data 7160 can include sensor data 7103 (e.g., obtained from sensor modules of vehicle 7111), location data 7163 (e.g., position of vehicle 7111 when an object is detected), data related to activation of an emergency braking system, and/or data output from an artificial neural network. During operation, vehicle 7111 collects data regarding objects that are detected such as object 7155 and object 7157.

In one embodiment, the event data 7160 is extracted from non-volatile memory of vehicle 7111 and communicated through a wireless communication network 7102 to server 7101. Server 7101 analyzes the event data 7160 (e.g., to do further processing on image data to support an object detection by vehicle 7111). In one example, server 7101 selects the type of event data 7160 (e.g. sensor data or control system status) to be downloaded for analysis. One example of wireless communication network 7102 is a cell phone network.

The collected event data received from the vehicle 7111 by server 7101 is analyzed. For example, this analysis can include pattern recognition or other data analysis (e.g., determining a correlation of event data to other data).

In response to determining or identifying a detection of an object (e.g., by server 7101 and/or vehicle 7111), at least one action is performed. For example, server 7101 can transmit a communication to vehicle 7111 that causes the vehicle to re-configure software (e.g., to change configuration settings for a neural network that performs image analysis).

In one example, a vehicle may communicate, via a wireless connection 7115 to an access point (or base station) 7105, with the server 7101 to submit event data. The wireless connection 7115 may be made via a wireless local area network, a cellular communications network, and/or a communication link 7107 to a satellite 7109 or a communication balloon.

Optionally, the vehicle 7111 has a self-learning capability. After an extended period on the road, the vehicle 7111 may have its software re-configured. In one example, the centralized server 7101 may be operated by a factory, a producer or maker of the vehicle 7111 or a vendor of the autonomous driving and/or advanced driver assistance system for vehicle 7111.

Figure 8:
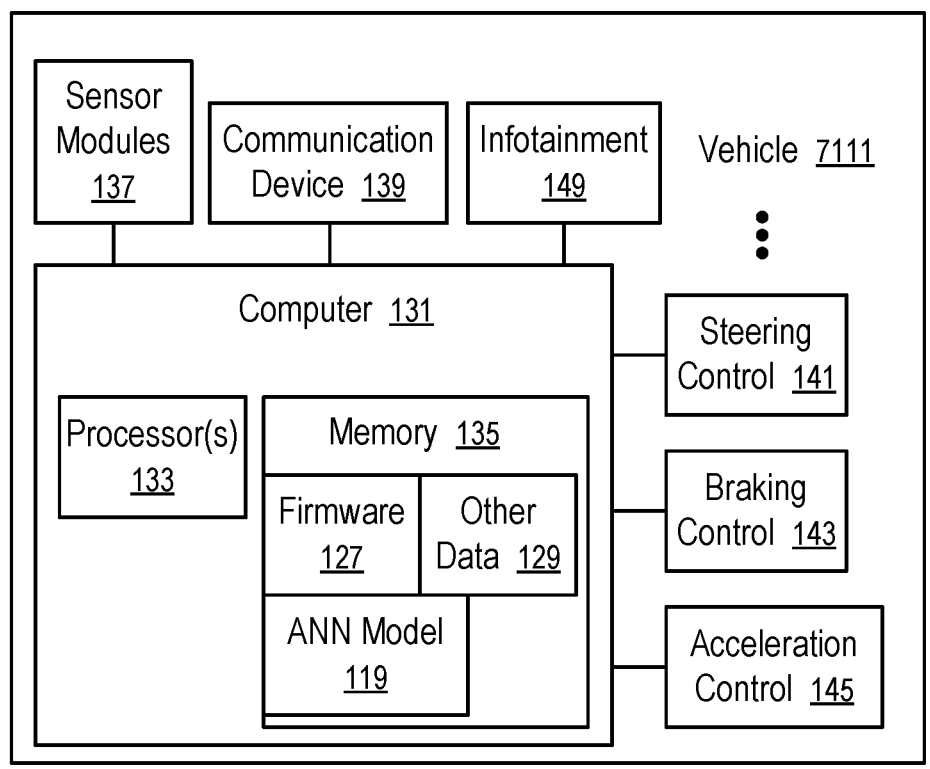
FIG. 8 illustrates an example of a vehicle including sensor modules and configured using an Artificial Neural Network (ANN) model, according to one embodiment.

FIG. 8 illustrates an example of vehicle 7111 including sensor modules 137 and configured using an Artificial Neural Network (ANN) model (e.g., computer model 115 of FIG. 1), according to one embodiment. Sensor modules 137 provide object data to computer 131. Computer 131 includes a processor and/or a software process that performs the role of a central processing device (e.g., processor 107 of FIG. 1).

In one example, the object data is collected data corresponding to image frame 105 of FIG. 1. In one example, the collected data may be processed by a sensor module to make an initial object detection decision that is to be confirmed or refuted by computer 131.

The vehicle 7111 includes an infotainment system 149, a communication device 139, and one or more sensor modules 137. Computer 131 is connected to some controls of the vehicle 7111, such as a steering control 141 for the direction of the vehicle 7111, a braking control 143 for stopping of the vehicle 7111, an acceleration control 145 for the speed of the vehicle 7111, etc.

The computer 131 of the vehicle 7111 includes one or more processors 133, memory 135 storing firmware (or software) 127, the ANN model 119, and other data 129.

In one example, firmware 127 is updated by an over-the-air update in response to a communication from server 7101 sent in response to an object detection (e.g., an initial object detection decision received from vehicle 7111 and confirmed by server 7101 after processing of the initial object detection made by vehicle 7111). Alternatively, and/or additionally, other firmware of various computing devices or systems of vehicle 7111 can be updated.

The one or more sensor modules 137 may include a visible light camera, an infrared camera, a lidar, radar, or sonar system, and/or peripheral sensors, which are configured to provide sensor input to the computer 131. A module of the firmware (or software) 127 executed in the processor(s) 133 applies the sensor input to an ANN defined by the model 119 to generate an output that identifies or classifies an event or object captured in the sensor input, such as an image or video clip. Data from this identification and/or classification can be included in data collected by a memory device (e.g., a non-volatile memory device) and sent from vehicle 7111 to server 7101 as discussed above.

Alternatively, and/or additionally, an object detection (e.g., by the server and/or vehicle) can be used by an autonomous driving module of the firmware (or software) 127 to generate a response. The response may be a command to activate and/or adjust one of the vehicle controls 141, 143, and 145. In one embodiment, the response is an action performed by the vehicle where the action has been configured based on an update command from server 7101 (e.g., the update command can be generated by server 7101 in response to an object detection based on analysis of event data). In one embodiment, prior to generating the control response, the vehicle is configured. In one embodiment, the configuration of the vehicle is performed by updating firmware of vehicle 7111. In one embodiment, the configuration of the vehicle includes updating of the computer model stored in vehicle 7111 (e.g., ANN model 119).

In one embodiment, the server 7101 stores received sensor input as part of sensor data for the subsequent further training or updating of the ANN model 119 using a supervised training module. When an updated version of the ANN model 119 is available in the server 7101, the vehicle 7111 may use the communication device 139 to download the updated ANN model 119 for installation in the memory 135 and/or for the replacement of the previously installed ANN model 119. These actions may be performed in response to determining that vehicle 7111 is failing to properly detect objects and/or in response to identifying unsafe software.

In one example, the outputs of the ANN model 119 can be used to control (e.g., 141, 143, 145) the acceleration of a vehicle (e.g., 7111), the speed of the vehicle 111, and/or the direction of the vehicle 7111, during autonomous driving.

In one example, data obtained from a sensor of a vehicle may be an image that captures an object using a camera that images using lights visible to human eyes, or a camera that images using infrared lights, or a sonar, radar, or lidar system. In one embodiment, image data obtained from at least one sensor of the vehicle is part of the collected data from the vehicle that is analyzed. In some instances, the ANN model is configured for a particular vehicle based on the sensor and other collected data.

Figure 9:
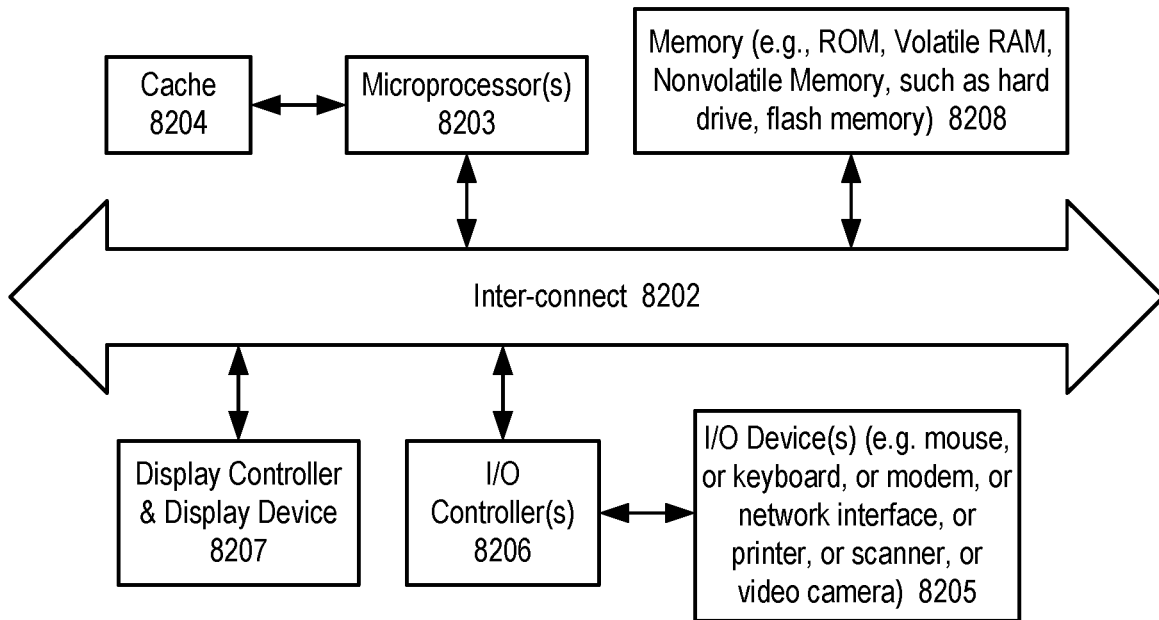
FIG. 9 shows a block diagram of a computing device (e.g., a server), which can be used in various embodiments.

In FIG. 9, computing device 8201 includes an inter-connect 8202 (e.g., bus and system core logic), which interconnects a microprocessor(s) 8203 and memory 8208. The microprocessor 8203 is coupled to cache memory 8204 in the example of FIG. 9.

The inter-connect 8202 interconnects the microprocessor(s) 8203 and the memory 8208 together and also interconnects them to a display controller and display device 8207 and to peripheral devices such as input/output (I/O) devices 8205 through an input/output controller(s) 8206. Typical I/O devices include mice, keyboards, modems, network interfaces, printers, scanners, video cameras and other devices which are well known in the art.

The inter-connect 8202 may include one or more buses connected to one another through various bridges, controllers and/or adapters. In one embodiment the I/O controller 8206 includes a USB (Universal Serial Bus) adapter for controlling USB peripherals, and/or an IEEE-1394 bus adapter for controlling IEEE-1394 peripherals.

The memory 8208 may include ROM (Read Only Memory), and volatile RAM (Random Access Memory) and non-volatile memory, such as hard drive, flash memory, etc.

Volatile RAM is typically implemented as dynamic RAM (DRAM) which requires power continually in order to refresh or maintain the data in the memory. Non-volatile memory is typically a solid-state drive, magnetic hard drive, a magnetic optical drive, or an optical drive (e.g., a DVD RAM), or other type of memory system which maintains data even after power is removed from the system. The non-volatile memory may also be a random access memory.

The non-volatile memory can be a local device coupled directly to the rest of the components in the computing device. A non-volatile memory that is remote from the computing device, such as a network storage device coupled to the computing device through a network interface such as a modem or Ethernet interface, can also be used.

In one embodiment, a computing device as illustrated in FIG. 9 is used to implement a computing device including processor 107, sensor module 612, server 7101, central processing device 618, and/or host processing device 620.

In another embodiment, a computing device as illustrated in FIG. 9 is used to implement a user terminal or a mobile device on which an application is installed or being installed. A user terminal may be in the form, for example, of a laptop or notebook computer, or a personal desktop computer.

In some embodiments, one or more servers can be replaced with the service of a peer to peer network of a plurality of data processing systems, or a network of distributed computing systems. The peer to peer network, or a distributed computing system, can be collectively viewed as a computing device.

Embodiments of the disclosure can be implemented via the microprocessor(s) 8203 and/or the memory 8208. For example, the functionalities described can be partially implemented via hardware logic in the microprocessor(s) 8203 and partially using the instructions stored in the memory 8208. Some embodiments are implemented using the microprocessor(s) 8203 without additional instructions stored in the memory 8208. Some embodiments are implemented using the instructions stored in the memory 8208 for execution by one or more general purpose microprocessor(s) 8203. Thus, the disclosure is not limited to a specific configuration of hardware and/or software.

Figure 10:
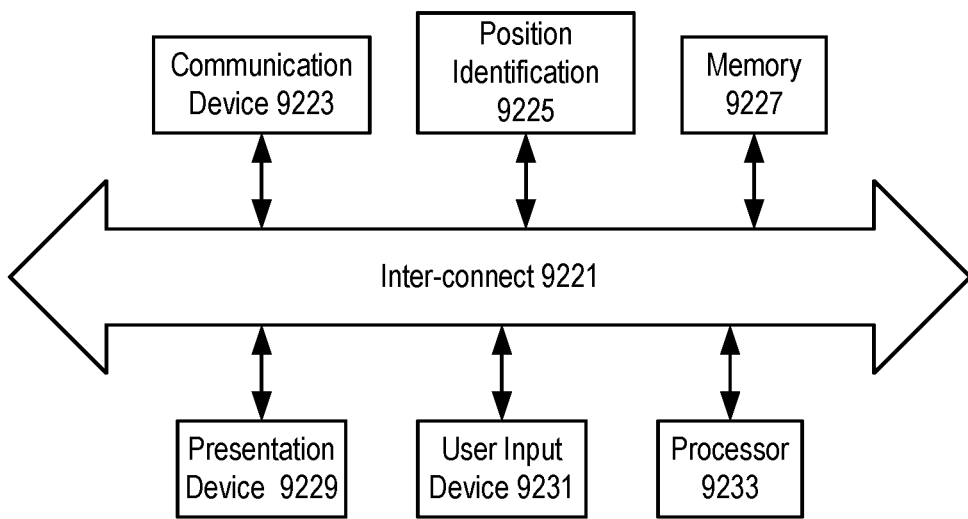
FIG. 10 shows a block diagram of a computing device (e.g., a mobile device of a user, or a user terminal), according to one embodiment.

FIG. 10 shows a block diagram of a computing device (e.g., a mobile device of a user, or a user terminal), according to one embodiment. In FIG. 10, the computing device includes an inter-connect 9221 connecting the presentation device 9229, user input device 9231, a processor 9233, a memory 9227, a position identification unit 9225 and a communication device 9223.

In FIG. 10, the position identification unit 9225 is used to identify a geographic location. The position identification unit 9225 may include a satellite positioning system receiver, such as a Global Positioning System (GPS) receiver, to automatically identify the current position of the computing device.

In FIG. 10, the communication device 9223 is configured to communicate with a server to provide data, including parameter data. In one embodiment, the user input device 9231 is configured to receive or generate user data or content. The user input device 9231 may include a text input device, a still image camera, a video camera, and/or a sound recorder, etc.

Figure 11:
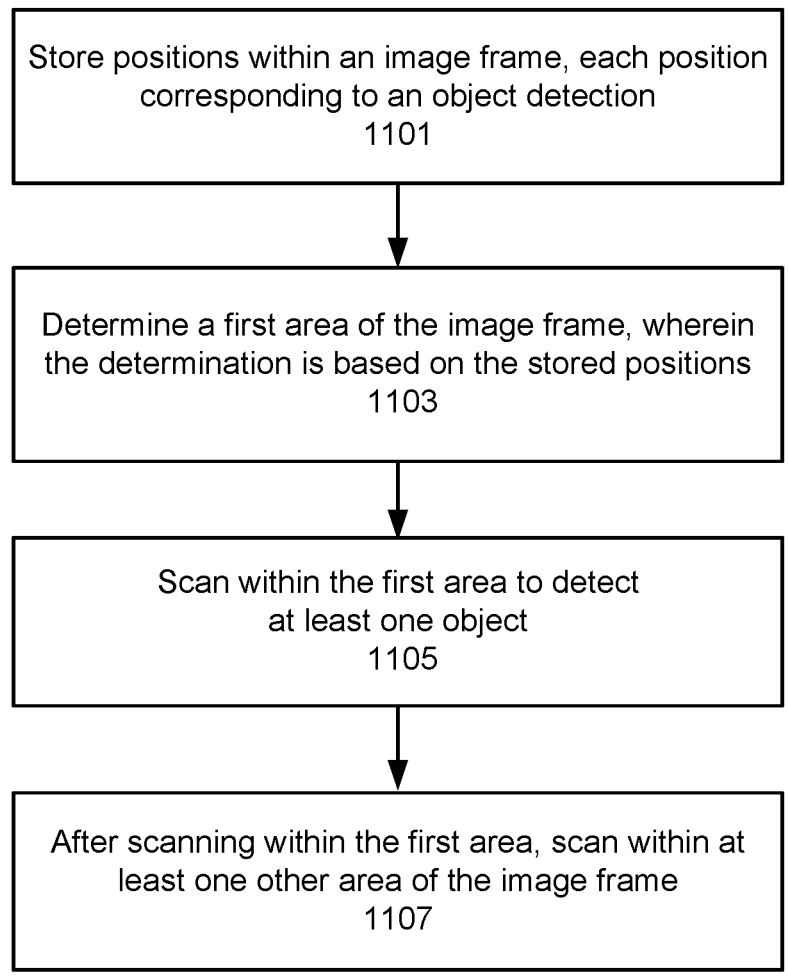
FIG. 11 shows a method for determining an area of an image frame for scanning of image data, according to one embodiment.

FIG. 11 shows a method for determining an area of an image frame for scanning of image data, according to one embodiment. For example, the method of FIG. 11 can be implemented in the system of FIGS. 1 and 5-8.

The method of FIG. 11 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof.

In some embodiments, the method of FIG. 11 is performed at least in part by one or more processors (e.g., processor 107 of FIG. 1). In some embodiments, the method is implemented by a system using the processors and memory of FIG. 9 or 10.

Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 1101, positions within an image frame of a sensor are stored in memory. Each of the positions corresponds to an object detection based on data collected by the sensor. In one example, the image frame is image frame 105 and the sensor is sensor 103. Each of the stored positions corresponds to a position of a scanning window 407 when one or more objects are detected at that position.

At block 1103, a first area of the image frame is determined. The determined first area will be used to begin scanning of data collected by the sensor for a subsequent image. The first area is determined based on the stored positions. In one example, the determined first area is Region A of FIG. 3, which has borders 402, 403, 404, 405 as shown in FIG. 4. The stored positions are scanning window positions 111.

At block 1105, the determined first area is scanned to detect one or more objects. In one example, the first area scanned by incrementing a scanning window within the first area of image frame 201.

At block 1107, after the first area is scanned, one or more other areas of the image frame are scanned. In one example, the other areas are Regions B, C, D, and/or E as shown in FIG. 3.

In one embodiment, a method comprises: storing, in memory, positions within an image frame (e.g., scanning window positions 111), each position corresponding to an object detection; determining a first area (e.g., Region A of FIG. 3) of the image frame, wherein the determination is based on the stored positions; scanning within the first area to detect at least one object (e.g., scanning at incremented positions 203, 205, 207); and after scanning within the first area, scanning within at least one other area of the image frame.

In one embodiment, scanning within the first area comprises scanning by incrementing a position of a scanning window within the first area, and the method further comprises determining whether an object is detected at each incremented position of the scanning window.

In one embodiment, each of the stored positions (X, Y) includes a pair of respective positions on a first axis (e.g., a Y axis) and a second axis (e.g., a X axis), and determining the first area comprises determining, using the stored positions, a maximum position on the first axis, and a minimum position on the second axis.

In one embodiment, the first axis is a vertical axis, and the second axis is a horizontal axis.

In one embodiment, the image frame is a frame for image data collected by a camera mounted to an autonomous vehicle, and the camera is configured to provide data for controlling navigation of the vehicle.

In one embodiment, scanning within the first area includes scanning by incrementing a position of a scanning window, and detecting a first object at a first position of the scanning window in the image frame.

In one embodiment, the stored positions are determined using data collected from one or more prior images, and scanning within the first area uses data collected from a current image.

In one embodiment, determining the first area comprises determining borders for the first area using vertical positions and horizontal positions corresponding to the stored positions.

In one embodiment, the borders comprise an upper border and a side border, the upper border is determined based on a maximum value of the vertical positions, and the side border is determined based on a minimum value of the horizontal positions.

In one embodiment, scanning within the first area includes scanning using a scanning window having a vertical size, the borders further comprise a lower border, and the lower border is determined based a minimum value of the vertical positions less the vertical size of the scanning window.

In one embodiment, each position is stored in response to an object detection associated with a scanning window, and the stored position is a current position of the scanning window when the object detection occurs.

In one embodiment, a number of the positions stored in the memory is limited to a predetermined maximum (e.g., 1,000 X, Y coordinate pairs), and determining the first area of the image frame is based on a number of the stored positions that is equal to or less than the predetermined maximum.

In one embodiment, the method further comprises, when the number of positions stored in the memory reaches the predetermined maximum, replacing one of the stored positions with a new position of the scanning window.

In one embodiment, for a predetermined time period, the at least one other area is associated with a total number of object detections that is less than a total number of object detections associated with the first area. In one example, the time period is five seconds. A total number of object detections in the first area Region A is five, and a total number of object detections in all other areas of an image frame is three during the same period of time. Region A is selected for initial scanning in the next image frame of data.

In one embodiment, a system comprises: at least one processing device; and memory containing instructions configured to instruct the at least one processing device to: store positions within an image frame of a sensor, each position corresponding to an object detection based on data collected by the sensor; select a first area of a plurality of areas of the image frame, wherein the first area (e.g., Region A) is selected using the stored positions and based on a level of object detection activity associated with each of the areas; and scan data collected within the first area for a current image, the scanning to detect at least one object within the first area.

In one embodiment, the first area has a level of object detection activity greater than a respective level of object detection activity for each the other areas.

In one embodiment, the stored positions correspond to data collected for at least one prior image.

In one embodiment, scanning the data comprises analyzing, using a computer model, at least a portion of the data collected within the first area.

In one embodiment, the computer model comprises a neural network.

In one embodiment, a non-transitory computer storage medium stores instructions which, when executed on at least one processing device, cause the at least one processing device to at least: store positions corresponding to collection of data by a sensor (e.g., a lidar sensor), each position associated with an object detection, and the sensor configured to collect data from a plurality of regions; select a first region of the plurality of regions, wherein the first region is selected based on the stored positions; and scan data collected within the first region, the scanning to detect at least one object within the first region.

Closing

The disclosure includes various devices which perform the methods and implement the systems described above, including data processing systems which perform these methods, and computer readable media containing instructions which when executed on data processing systems cause the systems to perform these methods.

The description and drawings are illustrative and are not to be construed as limiting. Numerous specific details are described to provide a thorough understanding. However, in certain instances, well-known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

As used herein, "coupled to" generally refers to a connection between components, which can be an indirect communicative connection or direct communicative connection (e.g., without intervening components), whether wired or wireless, including connections such as electrical, optical, magnetic, etc.

In this description, various functions and operations may be described as being performed by or caused by software code to simplify description. However, those skilled in the art will recognize what is meant by such expressions is that the functions result from execution of the code by one or more processors, such as a microprocessor, Application-Specific Integrated Circuit (ASIC), graphics processor, and/or a Field-Programmable Gate Array (FPGA). Alternatively, or in combination, the functions and operations can be implemented using special purpose circuitry (e.g., logic circuitry), with or without software instructions. Embodiments can be implemented using hardwired circuitry without software instructions, or in combination with software instructions. Thus, the techniques are not limited to any specific combination of hardware circuitry and software, nor to any particular source for the instructions executed by a computing device.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computing device or other system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system, middleware, service delivery platform, SDK (Software Development Kit) component, web services, or other specific application, component, program, object, module or sequence of instructions referred to as "computer programs." Invocation interfaces to these routines can be exposed to a software development community as an API (Application Programming Interface). The computer programs typically comprise one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a computing device causes the device to perform various methods. The executable software and data may be stored in various places including, for example, ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, solid-state drive storage media, removable disks, magnetic disk storage media, optical storage media (e.g., Compact Disk Read-Only Memory (CD ROMs), Digital Versatile Disks (DVDs), etc.), among others. The computer-readable media may store the instructions.

In general, a tangible or non-transitory machine readable medium includes any mechanism that provides (e.g., stores) information in a form accessible by a machine (e.g., a computer, mobile device, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by a computing device.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

Various embodiments set forth herein can be implemented using a wide variety of different types of computing devices. As used herein, examples of a "computing device" include, but are not limited to, a server, a centralized computing platform, a system of multiple computing processors and/or components, a mobile device, a user terminal, a vehicle, a personal communications device, a wearable digital device, an electronic kiosk, a general purpose computer, an electronic document reader, a tablet, a laptop computer, a smartphone, a digital camera, a residential domestic appliance, a television, or a digital music player. Additional examples of computing devices include devices that are part of what is called "the internet of things" (IOT). Such "things" may have occasional interactions with their owners or administrators, who may monitor the things or modify settings on these things. In some cases, such owners or administrators play the role of users with respect to the "thing" devices. In some examples, the primary mobile device (e.g., an Apple iPhone) of a user may be an administrator server with respect to a paired "thing" device that is worn by the user (e.g., an Apple watch).

In some embodiments, the computing device can be a host system, which is implemented, for example, as a desktop computer, laptop computer, network server, mobile device, or other computing device that includes a memory and a processing device. The host system can include or be coupled to a memory sub-system so that the host system can read data from or write data to the memory sub-system. The host system can be coupled to the memory sub-system via a physical host interface.

Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, etc. The physical host interface can be used to transmit data between the host system and the memory sub-system. The host system can further utilize an NVM Express (NVMe) interface to access memory components of the memory sub-system when the memory sub-system is coupled with the host system by the PCIe interface. The physical host interface can provide an interface for passing control, address, data, and other signals between the memory sub-system and the host system. In general, the host system can access multiple memory sub-systems via a same communication connection, multiple separate communication connections, and/or a combination of communication connections.

In one embodiment, the host system includes a processing device and a controller. The processing device of the host system can be, for example, a microprocessor, a graphics processing unit, a central processing unit (CPU), an FPGA, a processing core of a processor, an execution unit, etc. In one example, the processing device can be a single package that combines an FPGA and a microprocessor, in which the microprocessor does most of the processing, but passes off certain predetermined, specific tasks to an FPGA block. In one example, the processing device is a soft microprocessor (also sometimes called softcore microprocessor or a soft processor), which is a microprocessor core implemented using logic synthesis. The soft microprocessor can be implemented via different semiconductor devices containing programmable logic (e.g., ASIC, FPGA, or CPLD).

In some examples, the controller is a memory controller, a memory management unit, and/or an initiator. In one example, the controller controls the communications over a bus coupled between the host system and the memory sub-system.

In general, the controller can send commands or requests to the memory sub-system for desired access to the memory components. The controller can further include interface circuitry to communicate with the memory sub-system. The interface circuitry can convert responses received from the memory sub-system into information for the host system. The controller of the host system can communicate with the controller of the memory sub-system to perform operations such as reading data, writing data, or erasing data at the memory components and other such operations.

In some instances, a controller can be integrated within the same package as the processing device. In other instances, the controller is separate from the package of the processing device. The controller and/or the processing device can include hardware such as one or more integrated circuits and/or discrete components, a buffer memory, a cache memory, or a combination thereof. The controller and/or the processing device can be a microcontroller, special purpose logic circuitry (e.g., a field programmable gate array (FPGA), an application specific integrated circuit (ASIC), etc.), or another suitable processor.

The memory components can include any combination of the different types of non-volatile memory components and/or volatile memory components. An example of non-volatile memory components includes a negative-and (NAND) type flash memory. Each of the memory components can include one or more arrays of memory cells such as single level cells (SLCs) or multi-level cells (MLCs) (e.g., triple level cells (TLCs) or quad-level cells (QLCs)). In some embodiments, a particular memory component can include both an SLC portion and a MLC portion of memory cells. Each of the memory cells can store one or more bits of data (e.g., data blocks) used by the host system. Although non-volatile memory components such as NAND type flash memory are described, the memory components can be based on any other type of memory such as a volatile memory.

In some embodiments, the memory components can be, but are not limited to, random access memory (RAM), read-only memory (ROM), dynamic random access memory (DRAM), synchronous dynamic random access memory (SDRAM), phase change memory (PCM), magneto random access memory (MRAM), Spin Transfer Torque (STT)-MRAM, ferroelectric random-access memory (FeTRAM), ferroelectric RAM (FeRAM), conductive bridging RAM (CBRAM), resistive random access memory (RRAM), oxide based RRAM (OxRAM), negative-or (NOR) flash memory, electrically erasable programmable read-only memory (EEPROM), nanowire-based non-volatile memory, memory that incorporates memristor technology, and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. Furthermore, the memory cells of the memory components can be grouped as memory pages or data blocks that can refer to a unit of the memory component used to store data.

The controller of the memory sub-system can communicate with the memory components to perform operations such as reading data, writing data, or erasing data at the memory components and other such operations (e.g., in response to commands scheduled on a command bus by a controller). A controller can include a processing device (processor) configured to execute instructions stored in local memory. The local memory of the controller can include an embedded memory configured to store instructions for performing various processes, operations, logic flows, and routines that control operation of the memory sub-system, including handling communications between the memory sub-system and the host system. In some embodiments, the local memory can include memory registers storing memory pointers, fetched data, etc. The local memory can also include read-only memory (ROM) for storing micro-code. While the example memory sub-system includes the controller, in another embodiment of the present disclosure, a memory sub-system may not include a controller, and can instead rely upon external control (e.g., provided by an external host, or by a processor or controller separate from the memory sub-system).

In general, the controller can receive commands or operations from the host system and can convert the commands or operations into instructions or appropriate commands to achieve the desired access to the memory components. The controller can be responsible for other operations such as wear leveling operations, garbage collection operations, error detection and error-correcting code (ECC) operations, encryption operations, caching operations, and address translations between a logical block address and a physical block address that are associated with the memory components. The controller can further include host interface circuitry to communicate with the host system via the physical host interface. The host interface circuitry can convert the commands received from the host system into command instructions to access the memory components as well as convert responses associated with the memory components into information for the host system.

The memory sub-system can also include additional circuitry or components that are not illustrated. In some embodiments, the memory sub-system can include a cache or buffer (e.g., DRAM or SRAM) and address circuitry (e.g., a row decoder and a column decoder) that can receive an address from the controller and decode the address to access the memory components.

What is claimed is:

1. An apparatus comprising:
 a sensor configured to collect data;
 memory configured to store positions determined from data collected by the sensor for prior objects, wherein the stored positions comprise respective vertical and horizontal positions within an image frame for each of the prior objects; and
 at least one processor configured to:
  determine, based on a maximum and minimum of the stored vertical positions and a maximum and minimum of the stored horizontal positions, a first area to begin scanning within the image frame for a current object, wherein the current object is different from the prior objects; and
  scan within the first area to detect the current object.

2. The apparatus of claim 1, wherein determining the first area comprises determining borders for the first area using the stored vertical positions and the stored horizontal positions.

3. The apparatus of claim 2, wherein the borders comprise an upper border and a side border, the upper border is determined based on a maximum value of the vertical positions, and the side border is determined based on a minimum value of the horizontal positions.

4. The apparatus of claim 3, wherein scanning within the first area includes scanning using a scanning window having a vertical size, the borders further comprise a lower border, and the lower border is determined based on a minimum value of the vertical positions less than vertical size of the scanning window.

5. The apparatus of claim 1, wherein the processor is further configured to, after scanning within the first area, scan within additional areas of the image frame.

6. The apparatus of claim 1, wherein each of the stored positions includes a pair of respective positions on a first axis and a second axis, and determining the first area comprises determining, using the stored positions, a maximum position on the first axis, and a minimum position on the second axis.

7. The apparatus of claim 6, wherein the first axis is a vertical axis, and the second axis is a horizontal axis.

8. The apparatus of claim 1, wherein the respective vertical position and the respective horizontal position for each prior object is stored based on a current position of a scanning window when the prior object is detected.

9. The apparatus of claim 8, wherein a number of the positions stored in the memory is limited to a maximum, and determining the first area is based on a number of the stored positions that is equal to or less than the maximum.

10. The apparatus of claim 9, wherein the processor is further configured to, when the number of the positions stored in the memory reaches the maximum, replace one of the stored positions with a new position.

11. The apparatus of claim 1, wherein the image frame is for image data collected by a camera.

12. The apparatus of claim 1, wherein scanning within the first area includes scanning by incrementing a position of a scanning window.

13. The apparatus of claim 1, wherein the processor is further configured to determine whether an object is detected at each incremented position of a scanning window.

14. The apparatus of claim 1, wherein the processor is further configured to, after scanning within the first area, scan additional areas of the image frame in an order determined by a level of object detection activity for each additional area.

15. The apparatus of claim 14, wherein a second area of the additional areas is associated with a total number of object detections that is less than a total number of object detections associated with the first area.

16. A system comprising:
at least one processing device; and
memory containing instructions configured to instruct the at least one processing device to:
collect data for a plurality of prior objects, the data comprising a respective vertical and horizontal position for each of the prior objects within an image frame;
select, using a maximum or minimum of the vertical positions and a maximum or minimum of the horizontal positions, a first area of the image frame to begin scanning for a current object, wherein the current object is different from the prior objects; and
scan within the first area to detect the current object.

17. The system of claim 16, wherein the first area is selected based on determining that the first area has a level of object detection activity greater than a level of object detection activity determined for a second area.

18. The system of claim 16, wherein the scanning comprises analyzing, using a computer model, data collected within the first area.

19. The system of claim 18, wherein the computer model comprises a neural network.

20. A method comprising:
storing data for a plurality of prior objects, the data comprising a respective vertical and horizontal position for each of the prior objects within an image frame;
selecting, based on a maximum or minimum of the vertical positions and a maximum or minimum of the horizontal positions, a first region of the image frame to begin scanning for a current object, wherein the current object is different from the prior objects; and
scanning within the first region to detect the current object.

* * * * *